(12) United States Patent
Boitel et al.

(10) Patent No.: US 6,836,593 B2
(45) Date of Patent: Dec. 28, 2004

(54) OPTICAL FIBRE COMPRISING A BRAGG GRATING AND TUNABILITY MEANS

(75) Inventors: Michel Boitel, Perros Guirec (FR); Bruno Leguen, Pleumeur-Bodou (FR); Philippe Lesueur, Perros Guirec (FR)

(73) Assignee: Highwave Optical Technologies (FR)

( * ) Notice: Subject to any disclaimer, the term of this patent is extended or adjusted under 35 U.S.C. 154(b) by 109 days.

(21) Appl. No.: 10/048,513

(22) PCT Filed: May 31, 2001

(86) PCT No.: PCT/FR01/01691
§ 371 (c)(1),
(2), (4) Date: Apr. 25, 2002

(87) PCT Pub. No.: WO01/92930
PCT Pub. Date: Dec. 6, 2001

(65) Prior Publication Data
US 2002/0136493 A1 Sep. 26, 2002

(30) Foreign Application Priority Data
May 31, 2000 (FR) .............................. 00 07004

(51) Int. Cl.[7] .............................................. G02B 6/34
(52) U.S. Cl. ........................................................ 385/37
(58) Field of Search ............................... 385/37, 13, 7, 385/137, 24

(56) References Cited

U.S. PATENT DOCUMENTS

| | | | | |
|---|---|---|---|---|
| 5,682,445 A | * | 10/1997 | Smith | ............................ 385/7 |
| 5,774,619 A | | 6/1998 | Bruesselbach | |
| 5,991,483 A | * | 11/1999 | Engelberth | .................... 385/37 |
| 5,999,671 A | | 12/1999 | Jin et al. | |
| 6,240,220 B1 | * | 5/2001 | Pan et al. | ...................... 385/13 |
| 6,366,721 B1 | * | 4/2002 | Hu et al. | ....................... 385/37 |
| 6,633,702 B2 | * | 10/2003 | Hoshino | ........................ 385/37 |

FOREIGN PATENT DOCUMENTS

| | | |
|---|---|---|
| WO | 98/59267 A1 | 12/1998 |
| WO | 00/07047 A1 | 2/2000 |
| WO | 00/54082 A1 | 9/2000 |

* cited by examiner

Primary Examiner—Daniel Stcyr
Assistant Examiner—Daniel A. Hess
(74) Attorney, Agent, or Firm—Lerner, David, Littenberg, Krumholz & Mentlik, LLP

(57) ABSTRACT

The invention concerns an optical device comprising an optical fiber including at least an integrated component, a support including two fixing zones wherein the optical fiber is fixed respectively at the two zones located on either side of the component. The invention is characterized in that the support comprises, between the two fixing zones, at least a linking beam capable of bending and the device further comprises means for imposing a controlled bending to the beam, adapted to adjust the distance between the two fixing zones.

1 Claim, 2 Drawing Sheets

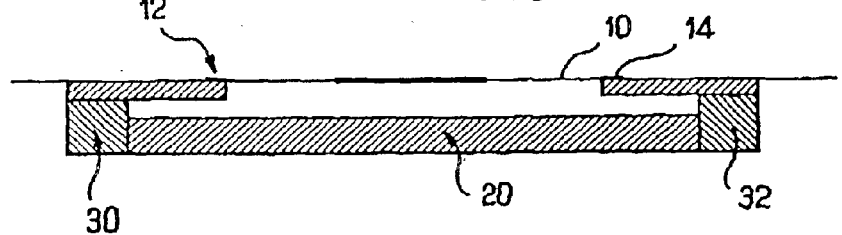
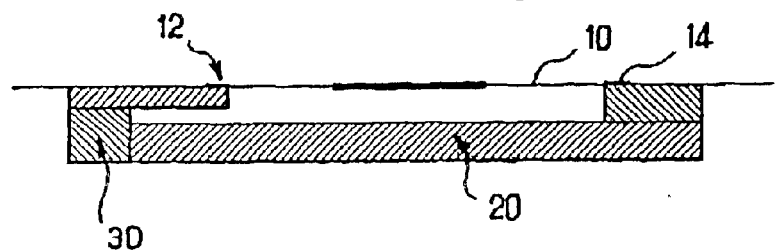
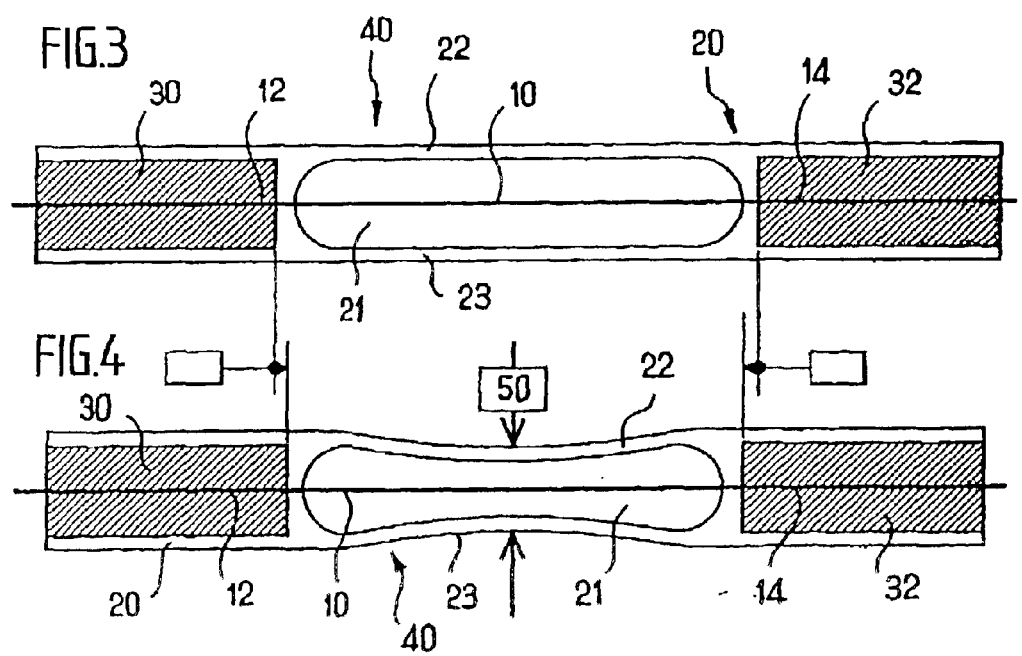

OPTICAL FIBRE COMPRISING A BRAGG GRATING AND TUNABILITY MEANS

The present invention relates to the field of optical fibers. Even more precisely, the present invention relates to the field of optical fibers which include an integrated component.

The present invention applies in particular to fiber-optic devices which include an integrated Bragg grating. Within this context, the invention aims to provide a device for temperature stabilization and/or Bragg wavelength adjustment of the gratings photowrittten in the optical fibers.

BACKGROUND OF THE INVENTION

A person skilled in the art knows that it is possible to considerably increase the traffic of optical-fiber networks by the technique of "wavelength multiplexing". Each series of data to be transported is transmitted over one specific optical frequency, multiplying the capacity of the fiber by the number of wavelengths used.

The number of multiplexible wavelengths in a given frequency band cannot, however, be increased ad infinitum. It depends on the levels of drift and on the degrees of precision of the devices capable of inserting a wavelength into the fiber or extracting it therefrom, without disturbing the flux of the other ones.

Among devices used, some rely on Bragg gratings written into the core of the fiber.

Bragg gratings are periodic optical index structures which have the particular feature of reflecting light of a well-defined wavelength, called the Bragg wavelength of the grating. Systems based on Bragg gratings have already been of great service. However, it turns out that this reflected wavelength, which depends on the periodicity of the grating and on the parameters of propagation in the fiber, is:

- an increasing function of temperature and
- an increasing function of the tension applied to the fiber.

Means for limiting the temperature drift of devices using Bragg gratings are known. The means most in use at the present time are known as tabletop or semi-tabletop arrangements. A description of illustrative examples of these means will be found in documents [1] and [2].

The appended FIGS. 1 and 2 show tabletop and semi-tabletop structures according to the prior art, respectively.

Tabletop or semi-tabletop arrangements consist of a beam 20 made of a material having a low expansion coefficient—invar, ceramic, etc.—and of one or two blocks 30, 32 made of a material having a high expansion coefficient, for example aluminum. The fibers 10 which include a Bragg grating are mounted so as to be held taught between the two blocks 30, 32 in the case of a tabletop or between the block 30 and the opposite end of the beam 20 in the case of a semi-tabletop, depending on the type of arrangement. The points for fixing the fiber 10 are labeled 12 and 14.

The distance between these two points 12, 14 decreases with increasing temperature and the tension applied to the fiber decreases and tends to reduce the Bragg wavelength, whereas, since temperature induces the opposite effect, an equilibrium is established between the two phenomena.

For this type of device to be stable over time requires the Bragg grating to be definitively held in place in this arrangement by adhesive bonding or welding. Any error between the Bragg wavelength obtained and the desired wavelength then becomes uncorrectable.

Moreover a person skilled in the art knows that the optical signal propagating in a fiber is attenuated over the course of its path. After a certain distance, it then becomes necessary to reamplify it. Many of the amplifiers used are fiber amplifiers which have the drawback of amplifying the light passing through them to a degree which varies with wavelength. To equalize the output levels of the various wavelengths, a gain-equalizing filter is added to these devices.

Gain-equalizing filters based on Bragg gratings consist of a succession of gratings with slanted lines. Each of these gratings extracts from the fiber a small portion of the light in the wavelength band corresponding to it, this amounting to producing a certain absorption in this band. The distribution of these various absorptions allows the output level of the light to be evened out, independently of its wavelength.

There is one tension value to be applied to the gain-equalizing filter in order to obtain the optimum result or, formulated another way, there is a value of the overall wavelength shift to be applied to the filter in order to have the flattest possible response.

In general, certain optical functions may require the Bragg gratings to be adjusted as desired; these are thus tunable gratings.

SUMMARY OF THE INVENTION

The objective of the invention is to provide a means of adjusting the response of fiber-optic-based devices which include an integrated component.

In particular, the objective of the present invention is to provide a means of adjusting the Bragg wavelength of tabletop or semi-tabletop arrangements.

The aforementioned objectives are achieved within the context of the present invention by a fiber-optic device comprising:

- an optical fiber which includes at least one integrated component,
- a support having two fixing regions to which the optical fiber is fixed at the two regions lying respectively on each side of the component, characterized in that:
- the support comprises, between the two fixing regions, at least one linking beam capable of bending, and in that
- the device furthermore comprises means which can impose a controlled bending on the beam, suitable for adjusting the distance between the two fixing regions.

BRIEF DESCRIPTION OF THE DRAWINGS

Further features, objectives and advantages of the present invention will become apparent on reading the detailed description which follows and in conjunction with the appended drawings, given by way of nonlimiting examples and in which:

FIGS. 1 and 2, described above, show schematically two arrangements, in tabletop and semi-tabletop form, according to the prior art;

FIG. 3 shows a device according to the present invention, at rest;

FIG. 4 shows schematically the same device according to the present invention, during an adjustment phase.

DETAILED DESCRIPTION OF THE INVENTION

Figure 5:
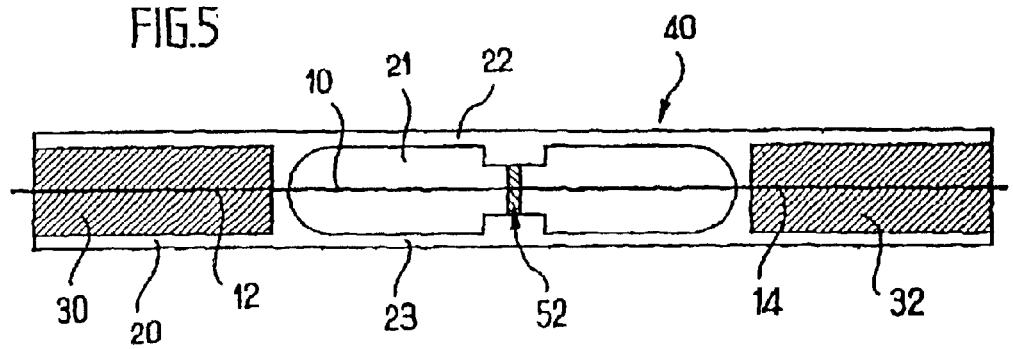
FIGS. 5 to 7 show three variants according to the present invention, FIG. 7 showing a view in a plane orthogonal to FIGS. 3 to 6.

FIGS. 3 to 7 according to the present invention show a device comprising an optical fiber 10 fixed at 12, 14 to a support 40.

The support 40 comprises a beam 20 made of a material having a low expansion coefficient—invar, ceramic or equivalent, etc.—and, depending on whether it is a tabletop or a semi-tabletop arrangement, one or two blocks 30, 32 made of a material having a high expansion coefficient, for example aluminum.

The fibers 10 which include a Bragg grating are mounted so as to be held taught between the two blocks 30, 32 in the case of a tabletop or between the block 30 and the opposite end of the beam 20 in the case of a semi-tabletop.

The materials making up the support 40 and their dimensions are tailored so that the effect of temperature on the Bragg grating and on the reflected wavelength is compensated for by the variation in tension in the fiber (the variation in distance between the two fixing points 12, 14, which distance decreases with increasing temperature, and the resulting variation in the tension applied to the fiber decrease and tend to reduce the Bragg wavelength, whereas temperature intrinsically induces the opposite effect on the Bragg grating).

These arrangements, well known in themselves to those skilled in the art, will not be described in detail below.

However, as indicated above, according to the present invention:

the support 40 comprises, between the two fixing regions 12 and 14, at least one linking beam 20 capable of bending; and the device furthermore comprises means, shown schematically by the reference 50 in FIG. 4, which can impose a controlled bending on the beam 20, suitable for adjusting the distance between the two fixing regions 12, 14.

When a bending force is applied to the beam 20, the fixed points 12, 14 of the Bragg grating formed in the fiber 10 are brought closer together. The relaxation of the tension which results therefrom reduces the wavelength to a defined value.

According to the embodiment in accordance with the present invention illustrated in FIG. 3, that region of the support 40 which is located between the two fixing regions 12 and 14 consists of a beam 20 recessed at its center. Thus, the beam is formed from two parallel sidewalls or bars 22, 23.

More precisely, according to the embodiment illustrated in FIG. 3, the central recess 21 delimiting the bars 22, 23 is oblong and defines bars 22, 23 having at least, approximately the same cross section over their entire length. However, the invention is not limited to this recess geometry 21, nor to bars 22, 23 of constant cross section. Thus, it may be envisioned to have recesses defining a controlled variation in the cross section of the bars 22, 23 in order to control the bending region of the latter.

However, it should be noted that it is preferable within the context of the present invention, for the beam 20 providing the link between the two fixing regions 12, 14 to be symmetrical with respect to a longitudinal plane passing through the axis of the fiber 10. This symmetry, whatever the bending applied to the beam 20, prevents harmful mechanical stresses being applied to the fiber 10.

The means 50 capable of controlling the bending of the beam 20, and more precisely of bringing the sidewalls 22, 23 of the said beam 20 closer together, may be the subject of many embodiments.

According to a first embodiment illustrated in FIG. 5, these means 50 for controlling the bending by bringing the sidewalls 22, 23 of the recessed beam 20 closer together, comprise a screw 52 transverse to the beam.

Such a screw 52 may comprise two portions of reverse pitch which respectively engage with one of the sidewalls 22 and 23, or else a single threaded portion which engages with one of the sidewalls 22 or 23, a head or stop on the screw resting against the other sidewall 23 or 22.

According to yet another embodiment, the screw 52 may be designed to control the bending of the beam 20 by moving the sidewalls 22, 23 further apart, and not closer together.

Figure 6:
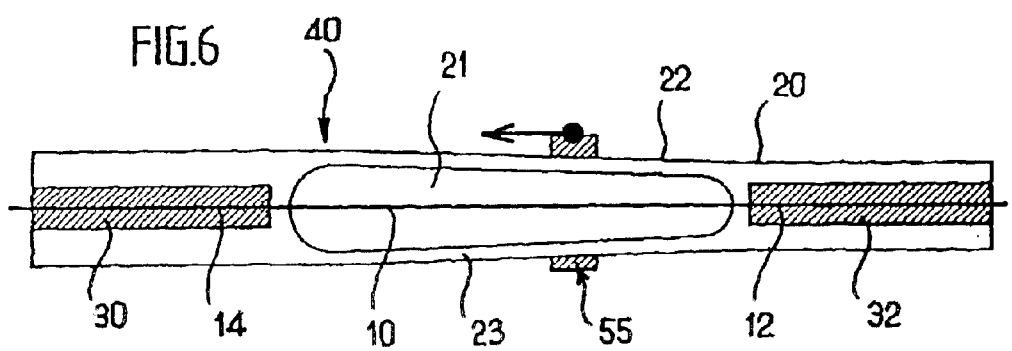

FIG. 6 illustrates another embodiment according to the present invention, whereby the beam 20, delimited in the two symmetrical sidewalls 22, 23 by a central recess 21, has a conical overall envelope. In other words, the beam 20 has a cross section which increases from the fixing region 12 toward the fixing region 14. In this case, the means for adjusting the bending is formed by a ring 52, the internal cross section of which is complementary to the external cross section of the beam 20 in its region of smallest cross section and which ring can be moved along the beam 20. A person skilled in the art will understand that the bending of the beam is a minimum when the ring 55 is close to the first fixing region 12 and, in contrast, the bending of the beam 20 is a maximum when the ring 55 is close to the fixing region 14.

According to the embodiments described above, the beam 20 is composed of two symmetrical bars 22, 23. As a variant however, devices according to the present invention may be produced with the aid of a single linking bar.

Moreover, according to the embodiments described above, the beam 20 is deformed in bending by deformation of the beam or of the bars 22, 23 in a direction perpendicular to the plane of symmetry of the fixing regions 12, 14 (which plane of symmetry is perpendicular to the plane of FIGS. 3 to 6).

However, as a variant, it may be envisioned to control the bending of the beam 20 by deformation in a direction parallel to the plane of symmetry of the fixing regions 12, 14. An embodiment for this purpose is illustrated in FIG. 7.

Figure 7:
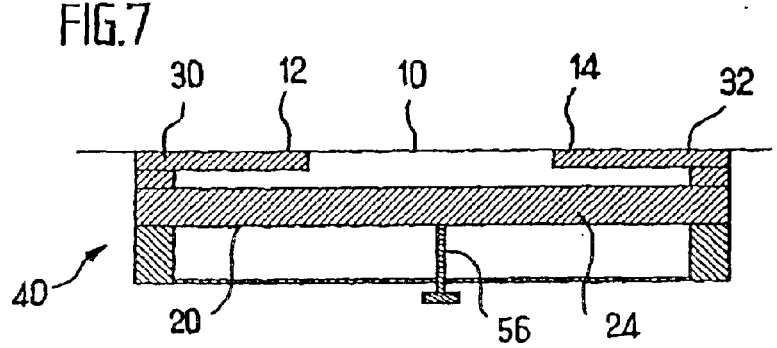

This FIG. 7 illustrates a variant which includes a screw 56 whose axis lies in the aforementioned plane of symmetry, the said screw engaging with a bar 24 located between the two fixing regions 12, 14, while its head rests on a rigid support or on a second symmetrical bar, in order to control at least the bending of the bar 24.

Of course, the present invention is not limited to the particular embodiment that has just been described, but encompasses all variants falling within its spirit.

It should be noted, for example, that within the context of the present invention the various means for adjusting the bending of the support 40 may be controlled manually or by a motor drive.

BIBLIOGRAPHY

[1] V. Fleury

"Stabilisation thermique des réseaux de Bragg photoinscrits sur fibre optique [*Thermostabilization of photowritten Bragg gratings in an optical fiber*]", DESS INGENERIE LASER Training Course Report at the Université des Sciences et Technologies de Lille [*Lille University of Sciences and Technologies*].

[2] J. Rioublanc et al.

"Optimisation d'un système de stabilisation passive de la dérive en température de la longueur d'onde d'accord des réseaux de Bragg [*Optimization of a system for the passive stabilization of the temperature drift of the tuning wavelength of Bragg gratings*]", JNOG96, Paper No. 85.

What is claimed is:

1. A fiber-optic device, comprising:

an optical fiber which includes at least one integrated component, and a support having two fixing regions to which the optical fiber is fixed at the two regions lying respectively on each side of the component, wherein the support comprises, between the two fixing regions, at least one linking beam capable of bending, the linking beam being delimited in two sidewalls by a central recess and having a conical overall envelope, and the means for adjusting the bending is formed by a ring, the internal cross section of which is complementary to the external cross section of the beam in its region of smallest cross section, which ring can be moved along the beam, the device furthermore comprises means which can impose a controlled heading on the beam; suitable for adjusting the distance between the two fixing regions.

* * * * *

UNITED STATES PATENT AND TRADEMARK OFFICE
CERTIFICATE OF CORRECTION

PATENT NO. : 6,836,593 B2
DATED : December 28, 2004
INVENTOR(S) : Michel Boitel, Philippe Lesueur and Bruno Leguen It is certified that error appears in the above-identified patent and that said Letters Patent is hereby corrected as shown below:

Column 3,
Line 46, after "least", delete ",".
Line 53, after "preferable", insert -- , --.
Line 66, after "together", delete -- , --.

Column 6,
Line 7, "furthermore comprises" should read -- further comprising --.

Signed and Sealed this

Twenty-sixth Day of April, 2005

JON W. DUDAS
*Director of the United States Patent and Trademark Office*